(12) United States Patent
Davar et al.

(10) Patent No.: US 9,990,609 B2
(45) Date of Patent: Jun. 5, 2018

(54) EVALUATING SERVICE PROVIDERS USING A SOCIAL NETWORK

(71) Applicant: 0934781 B.C. Ltd, Vancouver (CA)

(72) Inventors: Ali Davar, Vancouver (CA); David Robert Thompson, Vancouver (CA); Maziyar Hamdi, Vancouver (CA)

(73) Assignee: 0934781 B.C. Ltd, Vancouver (CA)

( * ) Notice: Subject to any disclaimer, the term of this patent is extended or adjusted under 35 U.S.C. 154(b) by 0 days. days.

(21) Appl. No.: 15/221,675

(22) Filed: Jul. 28, 2016

(65) Prior Publication Data

US 2016/0335603 A1 Nov. 17, 2016

Related U.S. Application Data

(63) Continuation-in-part of application No. 14/937,203, filed on Nov. 10, 2015, and a continuation-in-part of application No. 14/537,092, filed on Nov. 10, 2014, now Pat. No. 9,773,272, application No. 15/221,675, which is a continuation-in-part of application No. 14/690,325, filed on Apr. 17, 2015.

(60) Provisional application No. 62/101,952, filed on Jan. 9, 2015, provisional application No. 62/082,088, filed on Nov. 19, 2014, provisional application No. 62/082,076, filed on Nov. 19, 2014, provisional application No. 62/126,372, filed on Feb. 27, 2015.

(51) Int. Cl.
| | |
|---|---|
| *G06Q 10/10* | (2012.01) |
| *G06F 17/30* | (2006.01) |
| *G06Q 30/02* | (2012.01) |
| *G06Q 30/06* | (2012.01) |
| *G06Q 50/00* | (2012.01) |

(52) U.S. Cl.
CPC ... *G06Q 10/1053* (2013.01); *G06F 17/30386* (2013.01); *G06F 17/30867* (2013.01); *G06Q 30/0201* (2013.01); *G06Q 30/0601* (2013.01); *G06Q 30/0631* (2013.01); *G06Q 50/01* (2013.01)

(58) Field of Classification Search
CPC .............................................. G06Q 10/063112
USPC ....................................................... 705/7.14
See application file for complete search history.

(56) References Cited

U.S. PATENT DOCUMENTS

| | | |
|---|---|---|
| 8,204,903 B2 | 6/2012 | Bowers et al. |
| 9,177,056 B2 | 11/2015 | Zappacosta et al. |
| 2007/0214250 A1 | 9/2007 | Ahmed |
| 2011/0276505 A1 | 11/2011 | Schmitt |
| 2014/0164167 A1* | 6/2014 | Taylor ................. G06Q 30/0611 705/26.4 |
| 2014/0358810 A1 | 12/2014 | Hardtke et al. |
| 2015/0025928 A1* | 1/2015 | Kang ............. G06Q 10/063112 705/7.14 |
| 2015/0046353 A1 | 2/2015 | Elman et al. |

(Continued)

OTHER PUBLICATIONS

Website: Thumbtack.com, Sample pages printed May 19, 2016, 2 pgs http://web.archive.org/web/20160422100159/https://www.thumbtack.com/.

(Continued)

*Primary Examiner* — Mila Airapetian

(57) ABSTRACT

A method and system are provided for analyzing data in an online professional social network to identify, score, and match users with regard to providing professional services. A graph structure provides an efficient structure for accessing and processing data about service providers in order to create a service marketplace.

10 Claims, 10 Drawing Sheets

(56) References Cited

U.S. PATENT DOCUMENTS

| | | | |
|---|---|---|---|
| 2015/0142602 A1* | 5/2015 | Williams | G06Q 30/0631 |
| | | | 705/26.7 |
| 2015/0235313 A1* | 8/2015 | Jiang | G06Q 40/04 |
| | | | 705/37 |
| 2015/0371173 A1* | 12/2015 | Jalali | G06Q 10/063112 |
| | | | 705/7.14 |
| 2016/0034583 A1 | 2/2016 | Agarwal | |

OTHER PUBLICATIONS

Website: firverr.com, Sample pages printed May 19, 2016, 1 pg http://web.archive.org/web/20160518202515/https://www.fiverr.com/.

Website: Upwork.com, Sample pages printed May 19, 2016, 4 pgs http://web.archive.org/web/20160510005410/https://www.upwork.com/.

Website: freelancer.com, Sample pages printed May 19, 2016, 2 pgs http://web.archive.org/web/20160518063528/https://www.freelancer.com/.

Website: linkedin.com, Sample pages printed May 19, 2016, 1 pg.

Conan C. Albrecht, Douglas L. Dean, and James V. Hansen. 2005. Marketplace and technology standards for B2B e-commerce: progress, challenges, and the state of the art. Inf. Manage. 42, 6 (Sep. 2005), 865-875. DOI=http://dx.doi.org/10.1016/j.im.2004.09.003.

\* cited by examiner

Fig. 2

| Contact | S1 (relevance) | S2 (activity) | S3 (insight) | S4 (strength) | $S_{tot}$ |
|---|---|---|---|---|---|
| R4 | 0.8 | 0.7 | 0.9 | 1.0 (endorse) | 0.50 |
| R5 | 0.4 | 0.8 | 0.7 | 0.9 (endorse) | 0.20 |
| R6 | 0.2 | 0.1 | 0.4 | 1.0 (message) | n/a |
|  |  |  |  | $\Sigma S_{tot}$ | 0.70 |
| F2 Relevance |  |  |  |  | 0.88 |
| TOTAL for F2 |  |  |  |  | 1.58 |

| Factor | Example R3 | Units | Threshold (min) | Scale Function | Weight | R6 Total |
|---|---|---|---|---|---|---|
| Profile relevancy S1 | 85 | Percent | 40 | Linear | 0.1 | 8.5 |
| Activity (last month) S2 | 8 | Event count | 2 | log | 5 | 4.5 |
| Login (last year) S2 | 55 | Event count | 5 | log | 2 | 3.4 |
| Joint Projects S3 | 1 | Project count | 1 | linear | 8 | 8 |
| Job overlap/co-working S3 | 24 | Months | 3 | log | 5 | 6.9 |
| Messages (last year) S4 | 2 | Count | 3 | log | 5 | 0 |
| Endorsement (relevant) S4 | 2 | Count | 1 | Binary | 10 | 10 |
| $\Sigma S_{tot} = \Sigma S_{1,2,3,4} / 100$ | 41.3 | No unit | 10 | Normalize (0-1) | | 0.41 |

Fig. 8

EVALUATING SERVICE PROVIDERS USING A SOCIAL NETWORK

REFERENCES TO RELATED APPLICATIONS

This application is a continuation-in-part application of, and claims priority to, U.S. patent application Ser. No. 14/690,325, titled "Influential Peers," filed on Apr. 17, 2015; Ser. No. 14/937,203 titled "Social Proof of Organizations" filed on Nov. 10, 2015; and Ser. No. 14/537,092 titled "Recommendation Engine, filed Nov. 10, 2014"; Ser. No. 62/101,952, titled "Social Proof of Organizations" filed on Jan. 9, 2015; Ser. No. 62/082,088, titled "Business Relationship Accessing" filed on Nov. 19, 2014; Ser. No. 62/126,372, titled "Product or service recommendation" filed on Feb. 27, 2015; Ser. No. 62/082,076, titled "Business Relationship Accessing" filed on Nov. 19, 2014.

The disclosures of the foregoing applications are incorporated herein by reference in its entirety for all purposes.

BACKGROUND

Finding and evaluating someone to provide a professional service can be difficult. Even with the help of the Internet and the numerous websites that list service providers, it is hard for someone to know whom to trust and who is the best match.

This becomes particularly true with respect to high-skill professional services, which are harder to commoditize or specify via a search engine. Some of these providers are service firms and agencies (collections of professionals offering services under one business). However the budget and scope of the services required may be very small and better suited to freelancers. In fact, professional freelancing is a growing trend, which brings its own problems, as the service providers to be found are smaller, have weaker reputations, and less budget to market themselves.

Websites such as upwork.com, thumbtack.com, fiverr.com and freelancer.com provide a means to search for professional service providers, with some success. Furthermore the matching algorithm uses simple keyword matching or standard service categories. This search results are inefficient, being either a very large set if the keyword or service is common or a very small set if the exact keyword was not used or that specific service was not tagged in the profile. The results may rank results based on how many keywords matched but this is not a measure of the truth of these keywords or of the matching. This limits the precision possible when a more bespoke service is required.

For example, the searcher might not know what keywords/categories truly represent their needs. Thus there may be many false positives or false negatives just because a different keyword was used or service was described. Also a service provider could list a large number of skills, services, and keywords in their profile to direct many searches towards themselves. There is no third party data to support or refute these. There is therefore a need for systems, databases and methods to provide a better search engine with stronger signals to the users about the other service providers.

SUMMARY

This summary provides a selection of aspects of the invention in a simplified form that are further described below in the detailed description. This summary is not intended to limit the claimed subject matter's scope.

According to a first aspect there is provided a computer-implemented method for processing and communicating data about service providers over a network using one or more processors. The method includes receiving professional profiles of a plurality of users from a social network; identifying services offered by each user; processing features from the profiles using a services model to calculate strength values associated with the services offered by each user; creating an index of service providers from the users, services offered and strength values; and retrieving and communicating data about service providers from the index in response to a search query.

Identifying services offered by each user may include retrieving present employment data from the profiles of the users and processing the present employment data using the services model to determine the services offered of the user.

Identifying services offered by each user may include: identifying services offered by a present employer of that user and processing features from that user's profiles using the services model to determine a subset of the present employer's services most likely offered by that user.

The method may process each user's profile using the services model to extract a set of keywords that are also associated with the identified set of services offered by that user.

The method may, for each user, identify, from the social network, immediate social contacts of that user and calculate a social relevance score of the social contacts with respect to a service for that user.

The method may, for each user, identify, from the social network, past projects performed by that user and calculating a project relevance score of the past projects with respect to certain services.

The services model may include at least one of: a topic model of services, a supervised classifier of services, a taxonomy of services, or a collaborative filter.

The strength value associated with the service may be a measure of evidence comprised in each user's profile that that user performs or is capable of performing that service.

According to a second aspect there is provided a computer-implemented method including: providing a social network accessible by users that act as service requesters and service providers; receiving a plurality of requests for a professional service from service requesters; recording actions performed on the social network, of the service providers with respect to the requests; and evaluating the actions as positive or negative with respect to each request to calculate and store response scores of the service providers with respect to the professional service that is relevant to that request.

The method may use the response scores to predict a likelihood of a particular service provider responding to a new request for a particular service.

The method may receive a new request for a professional service from one of the service requesters and ranking multiple service providers based on their response scores with respect to that service and communicating the ranked service providers to the service requester.

The actions recorded may be one or more of: declining a request, accepting a request, responding to a request, or ignoring a request sent to the user.

The method may create an index from the service providers, services offered and response scores for subsequent searching The method may remove a service from a set of services associated with the service provider if the provider's response score falls below a threshold for that service.

According to a third aspect there is provided a computer-implemented method including:
identifying, from a social network, users that are service providers;
for each service provider:
determining immediate social contacts of that service provider;
for each social contact:
retrieving, from the social network, a professional profile of that contact;
processing the professional profile using a services model to determine a social relevance score of that social contact to a particular service;
calculating a social score for that service provider, with respect to the particular service, from the social relevance scores of the social contacts, and
utilizing the social scores to rank the service providers on an outputted list of service providers.

The method may receive a service request from a service requester and communicating the ranked service providers to the service requester.

Identifying users that are service providers may include identifying users associated with providing one or more services that match one or more services of the service request.

The services model may estimate the social contact's ability to judge providers of the service, the estimate based on at least one of the social contact's: job title, experience, industry, education, and skills.

Determining the social relevance score may be further based on a level of activity of the social contact within the social network.

Determining the social relevance score may be further based on the level of interaction, within the social network, between each social contact and the respective service provider.

Determining the social relevance score is further based on whether that social contact has, within the social network, provided an endorsement for or responded to a request to provide a reference for the respective service provider.

Determining the social relevance score is further based on determining that a social contact was associated with a past project also associated with the service provider, the association and past project stored on the social network.

The method may, for each service provider, identify, from the social network, client organizations that were clients of that service provider and calculate the social score partly based on a similarity between the client organizations and another organization associated with the service request.

According to a fourth aspect there is provided a computer-implemented method for automating an online services marketplace. The method comprises: receiving a plurality of service requests from a plurality of first users, each request indicating a service to be provided and criteria related to the service; for each request, identifying, from an index, a plurality of second users that provide the service of that request;
retrieving profile data associated with the plurality of second users; and
automatically matching at least one of the second users to that request based on a comparison of features in the profile data of second users and features in the criteria.

The profiles may be retrieved from a professional social network.

The method may communicate to first users, an identification of second users that match the respective requests of first users.

The method may communicate the requests to the second users that match the requests.

The features of the profile data to be compared may be derived from at least one of: current job title, skills, education, current and past employment Each service request may include text describing aspects of the service to be provided and wherein matching is further based on a comparison of the features in the profile data of second users and features in the text describing aspects of the services.

The method may process profile data of second users using a services model to evaluate the relevance of one of the second users with respect to one of the service requests.

The relevance may be a measure of how well the profile data of the second provides evidence of an ability to provide the service.

The method may determining for one of the second users, an activity level based on an amount of activity of that second user within a social network system or based on responding or declining previous service requests within the marketplace.

Matching may include determining similarity scores between the first users and clients of previous service requests performed by second users.

Matching may include a comparison of endorsements in the profile data of second users and the service request.

According to a fifth aspect there is provided a computer-implemented method including: receiving, at a server, from a client computing device, a service request associated with a buyer; identifying service providers that match the service request; for each service provider: traversing a social graph to identify data objects representing past projects or immediate social contacts connected to that service provider and computing social relevance scores of the past projects or the social contacts with respect to the service request; ranking service providers based on the social relevance scores and communicating the ranked service providers to the client computing device.

The method may include: traversing the graph to identify past clients of the past projects; computing similarity scores between the past clients and the buyer; and ranking service providers based on the similarity scores with respect to their clients.

The clients and the buyer are organizations and similarity scores are based on attributes of the organizations.

The attributes may be at least one of industry, size, and location.

The clients and buyer may be users in an online social network and similarity scores may be based on features in professional profiles of the users.

The attributes may be at least one of industry, seniority, job function, education and location.

The method may retrieve professional profiles of the service providers from the social graph, process the professional profile using a services model to calculate a provider evidence score for each service provider with respect to the service request. The method may rank further based on the provider scores.

Identifying service providers may include searching an index of service providers using a service comprised in the service request.

The social relevance scores of each social contact may be determined from one or more of: a comparison of features in a professional profile of that social contact to features in the service request; using a services model, processing a professional profile of that social contact; an amount of activity of that social contacts on a social network system; an amount of social interactions on a social network system between that social contact and one of the service providers.

According to a sixth aspect there is provided a computer-implement method including: one or more processors identifying users registered on a social network that are service providers; the one or more processors retrieving from the social network professional profile data of said users; and the one or more processors generating and storing a services model from features extracted from the professional profile data, whereby the services model outputs a confidence score that a given user provides certain services.

The method may include generating the services model from historical behavior data of said users responding to requests for services from other users.

The services model may estimate a likelihood that a given service request, entered by a service requester, pertains to certain services.

The services model may estimate likelihood that a given user is able to provide a reference with respect to certain services.

The services model may be generated by a supervised classifier of service classes and the confidence may be an estimate that the given user is a member of one or more of the service classes.

The services model may be generated by an unsupervised clustering algorithm to define a plurality of service clusters and wherein the confidence is an estimate that the given user is a member of one or more of the service clusters.

According to a seventh aspect there is provided an online social network system having a database structured as a social graph, the social graph including: a plurality of node and edge objects, wherein the nodes represent users that are service providers or clients, at least some of the nodes being interconnected by an edge or node object representing a project performed by a first user as a service provider for a second user as a client, said edge or node object storing data about the project.

According to an eighth aspect there is provided a computer-implement method including: identifying a first user; traversing a social graph of a social network system to determining that the first user has provided professional services to one or more second users by: identifying graph objects representing a project and an indication that the first user provided professional services; identifying graph objects representing the one or more second users and an indication that the second users received the services; returning a set of second users. In response to a query about the first user, retrieving graph objects representing the one or more second users for processing a score for the first user Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

FIG. 2 is a web page of example search results.

Figure 8:
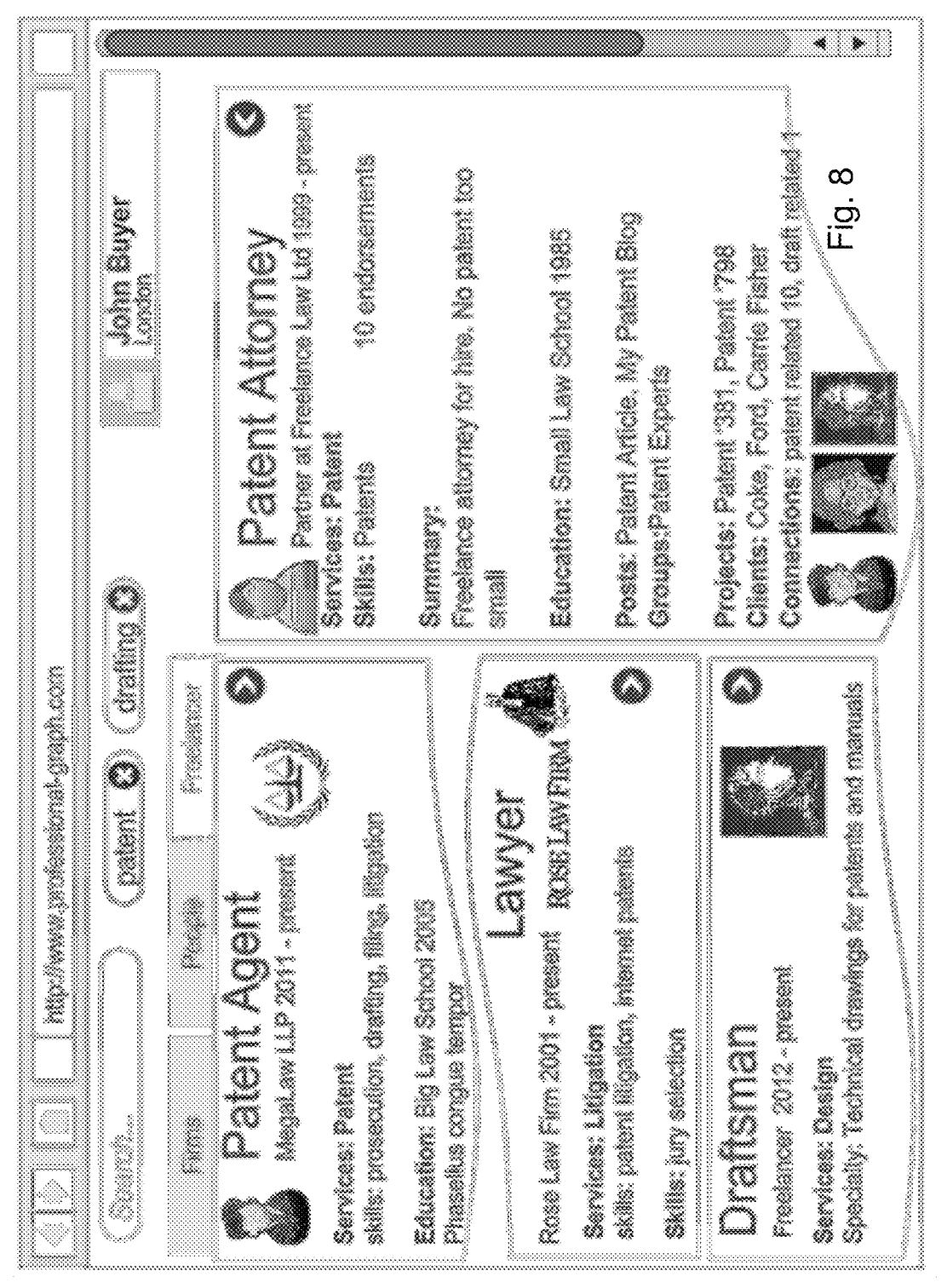

FIG. 8 is a webpage of sample search results.

DESCRIPTION

Figure 1:
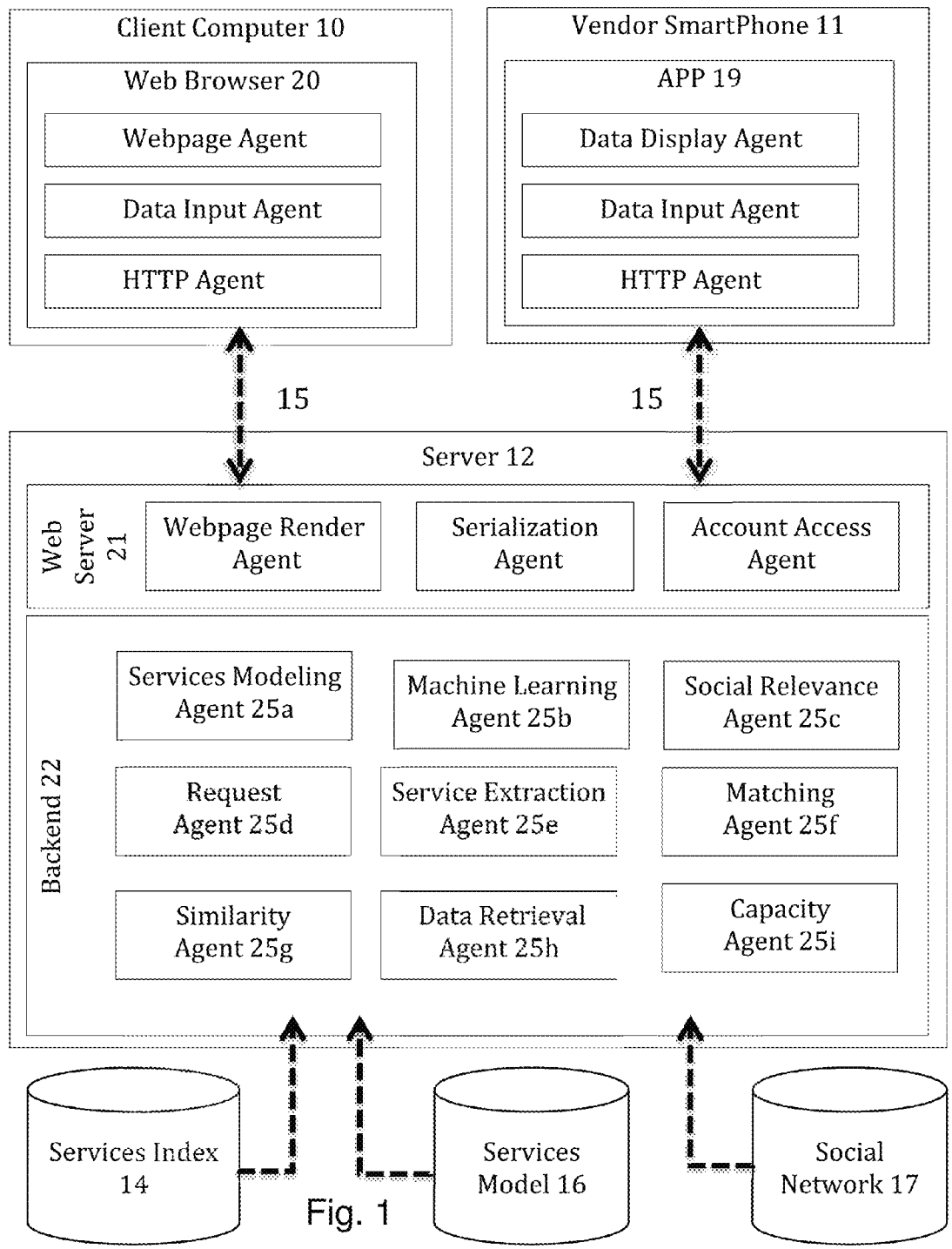
FIG. 1 is an illustration of connections between software agents of servers and client devices.

The inventors have appreciated that a suitably customized online social network would solve many of the drawbacks of current systems in order to improve matching between professional service providers and requesters. Social networks store data about users and the connections between them and are useful for discovering/searching for people. Online professional social networks, such as Linkedin, Xing, Tianji and Viadeo, store profile data of professionals and their professional connections to people (as co-workers) and organizations (via employment), and are useful in finding a candidate to fill a job opening. The profile data typically comprises distinct parts, such as current employment (title, employer, period, description of role), previous employment, skills, education. These networks have algorithms to aid in the finding and evaluation of candidates by matching keywords in job posting and profiles, as well as indicating any social connections between candidates and the employer or recruiter.

Figure 2:
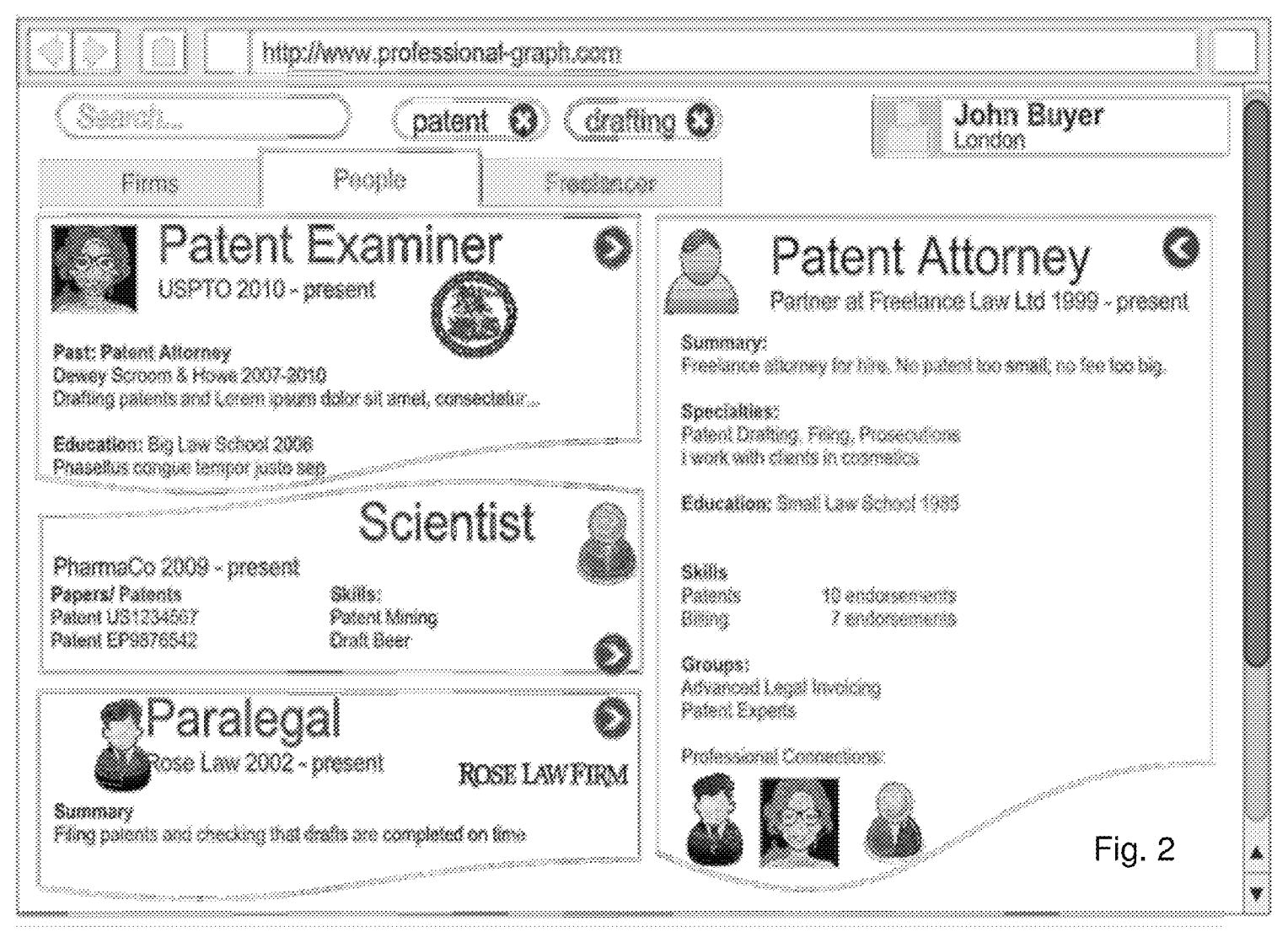

However such professional social networks are not currently optimized to find freelancers to provide a service for a project or task. For example, a search term would be matched to features in user profiles, which features might not represent the services that they can provide or whether they are even a freelancer. FIG. 2 shows example search results typical of present social networks for the task, "patent drafting." The results include people who are named inventors, paralegals at patent firms and patent attorneys at corporations. All of these people might be interested in a job opening but patent examiner, scientist and paralegal would not have both the skills and freedom to perform this task as a freelancer. Only the right-most profile (patent attorney) appears relevant to this search for a service provider. The social network needs to be modified to determine which users can freelance and which professional services they offer in order to make the search more efficient.

Not only is the intention of users of existing professional social networks geared towards hiring rather than tasks/projects freelancing but also the mechanics of the search are also different. Currently, employers post a highly-specified set of requirements that they know will fit their long-term needs, and then candidates search for such posts and determine if they are suitable. The candidate's entire profile is useful in determining relevance towards the job posting.

Conversely, the outsourced services requirements needed for a project may be more vague and flexible because the employer has less experience with and need for these services and hence they contract freelancers, instead of hiring people in-house full time. The foregoing descriptions of user behavior, knowledge and mindset are intended to provide a distinction between use cases of social networks and are not a necessary condition for the methods, algorithms and data structure that follows.

As will be seen, database operations may be simplified in the present methods by reducing the number of data objects to be communicated to the user and storing the most relevant user profiles in a service index.

The present technology is implemented using computer system and computer processing methods. FIG. 1 is an illustration of software modules and FIG. 10 is a block diagram of computing components provided in a system enabling searching and data processing.

FIG. 1 illustrates the interaction between client-computing devices 10/11 and the server 12 over network link 15. The devices 10, 11 may communicate via a web browser 20 or smartphone APP 19, using software agents to receive input from the user, make HTTP requests and display data. The server 12 may be a reverse proxy server for an internal network, such that the client device 10 communicates with an Nginx web server 21, which relays the client's request to backend processes 22, associated server(s) and database(s) 14, 16 and 17. Within the server, software agents 25a-i perform functions such as, retrieve data, build and process data via service model(s), match requests and providers and calculate various score. Some software agents may operate within a notional web server to manage user accounts and access, serialize data for output, render webpages, and handle HTTP requests from the devices 10, 11.

Figure 10:
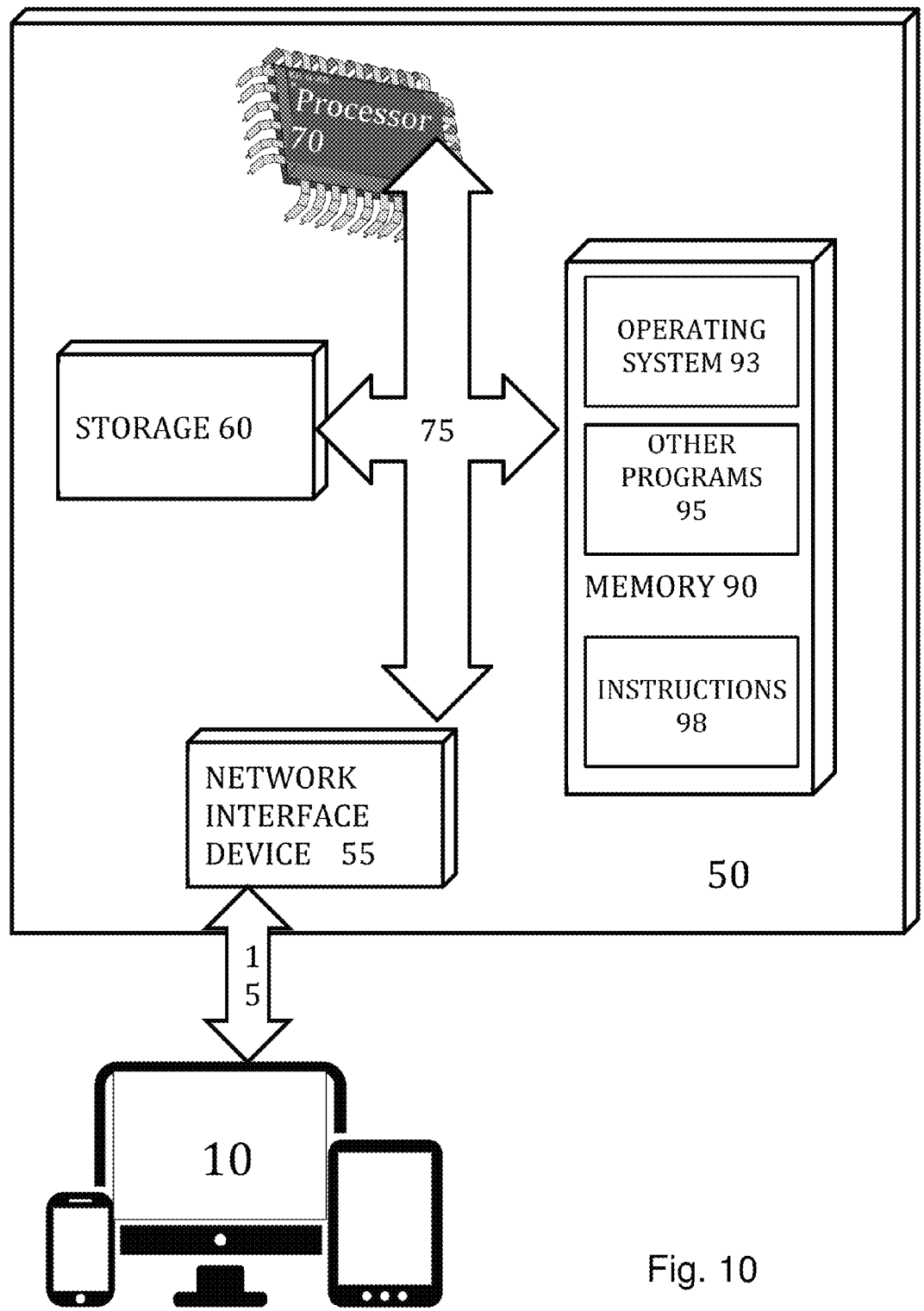
FIG. 10 is a block diagram of a computer system.

FIG. 10 is a block diagram of an exemplary computer system for creating the present system and performing methods described herein. The system 50 includes a bus 75 for connecting storage 60, non-volatile memory 90, one or more processors 70 and network interface device 55. The memory contains software for the operating system 93 and instructions 98 and other applications as may be needed. The network interface device communicates over the Internet connection 15 with client devices 10, 11.

The one or more processors may read instructions from computer-readable memory 90 and execute the instructions 98 to provide the methods and agents described below. Examples of computer readable media are non-transitory and include disc-based media such as CD-ROMs and DVDs, magnetic media such as hard drives and other forms of magnetic disk storage, semiconductor based media such as flash media, random access memory, and read only memory.

Users may access the databases remotely using a desktop or laptop computer, smartphone, tablet, or other client computing device 10 connectable to the server 12 by mobile internet, fixed wireless internet, WiFi, wide area network, broadband, telephone connection, cable modem, fiber optic network or other known and future communication technology using conventional Internet protocols.

The web server's Serialization Agent converts the raw data into a format requested by the browser. Some or all of the methods for operating the database may reside on the server device. The devices 10,11 may have software loaded for running within the client operating system, which software is programmed to implement some of the methods. The software may be downloaded from a server associate with the provider of the database or from a third party server. Thus the implementation of the client device interface may take many forms known to those in the art. Alternatively the client device simply needs a web browser and the web server 12 may use the output data to create a formatted web page for display on the client device. The devices and server may communicate via HTTP requests.

The methods and database discussed herein may be provided on a variety of computer system and are not inherently related to a particular computer apparatus, particular programming language, or particular database structure. The system is capable of storing data remotely from a user, processing data and providing access to a user across a network. The server may be implemented on a stand-alone computer, mainframe, distributed network or over a cloud network.

Marketplace

Figure 6:
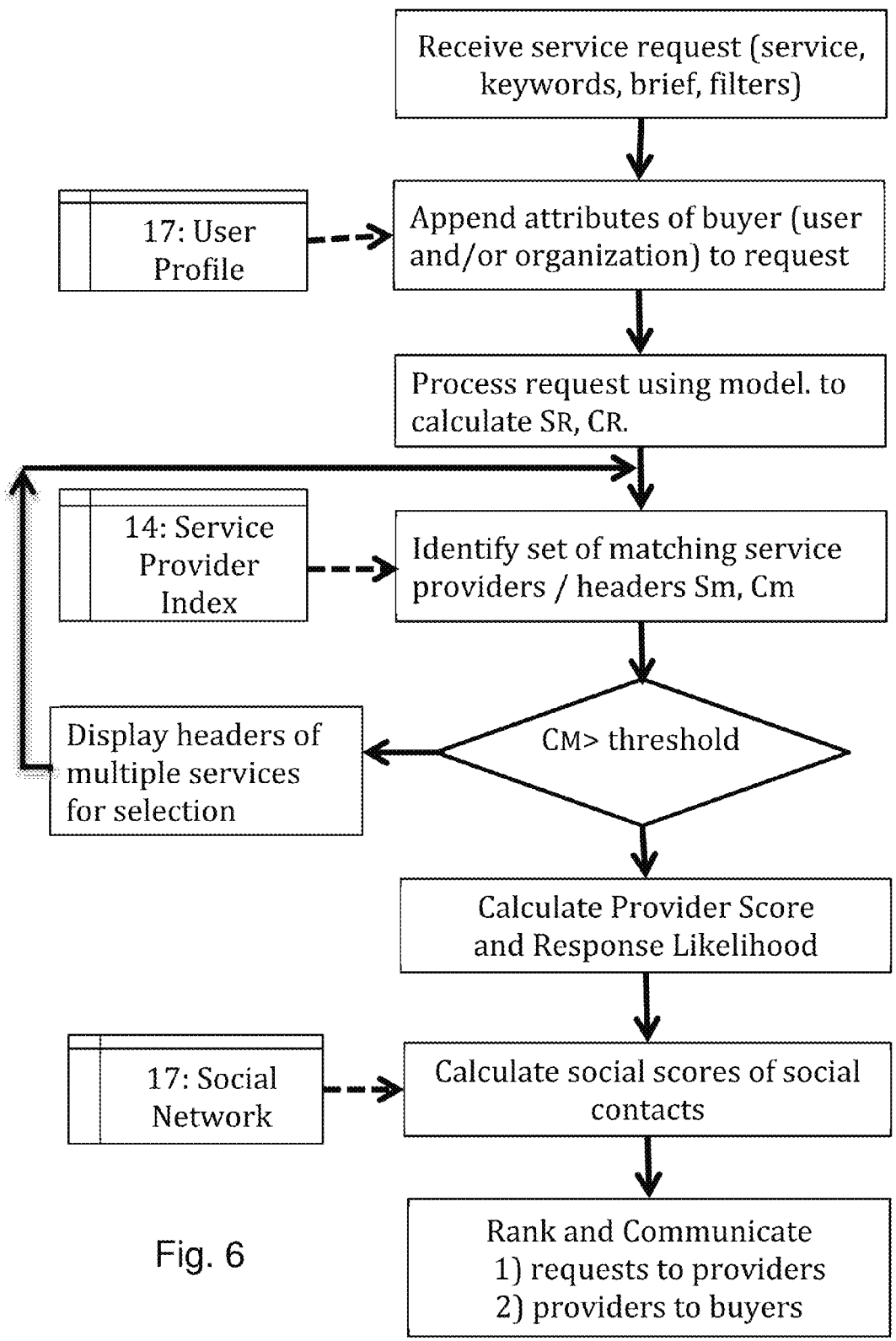
FIG. 6 is a flowchart for matching service providers and service requests.
Figure 7:
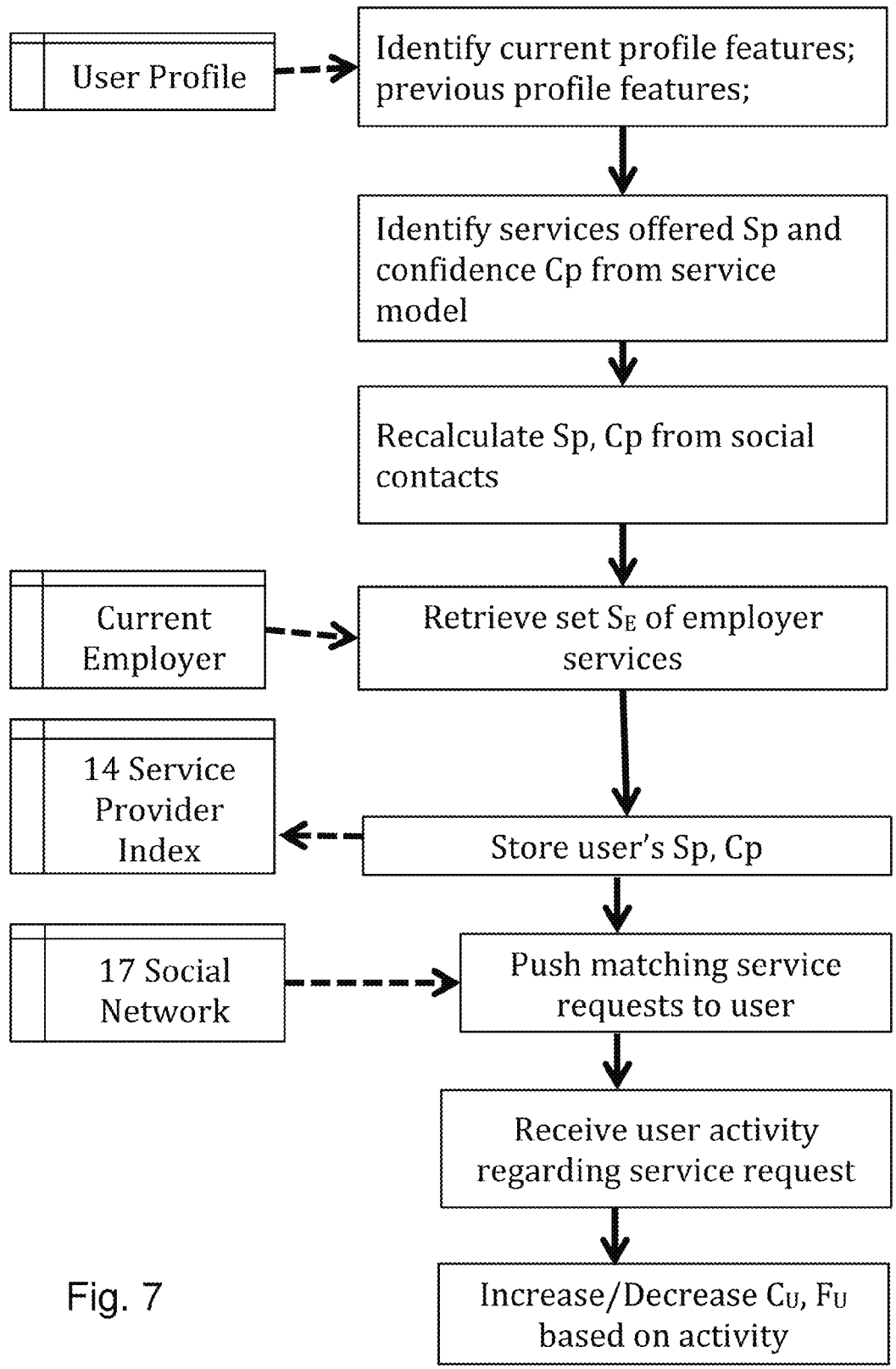
FIG. 7 is a flowchart for determining services of service providers.
Figure 9:
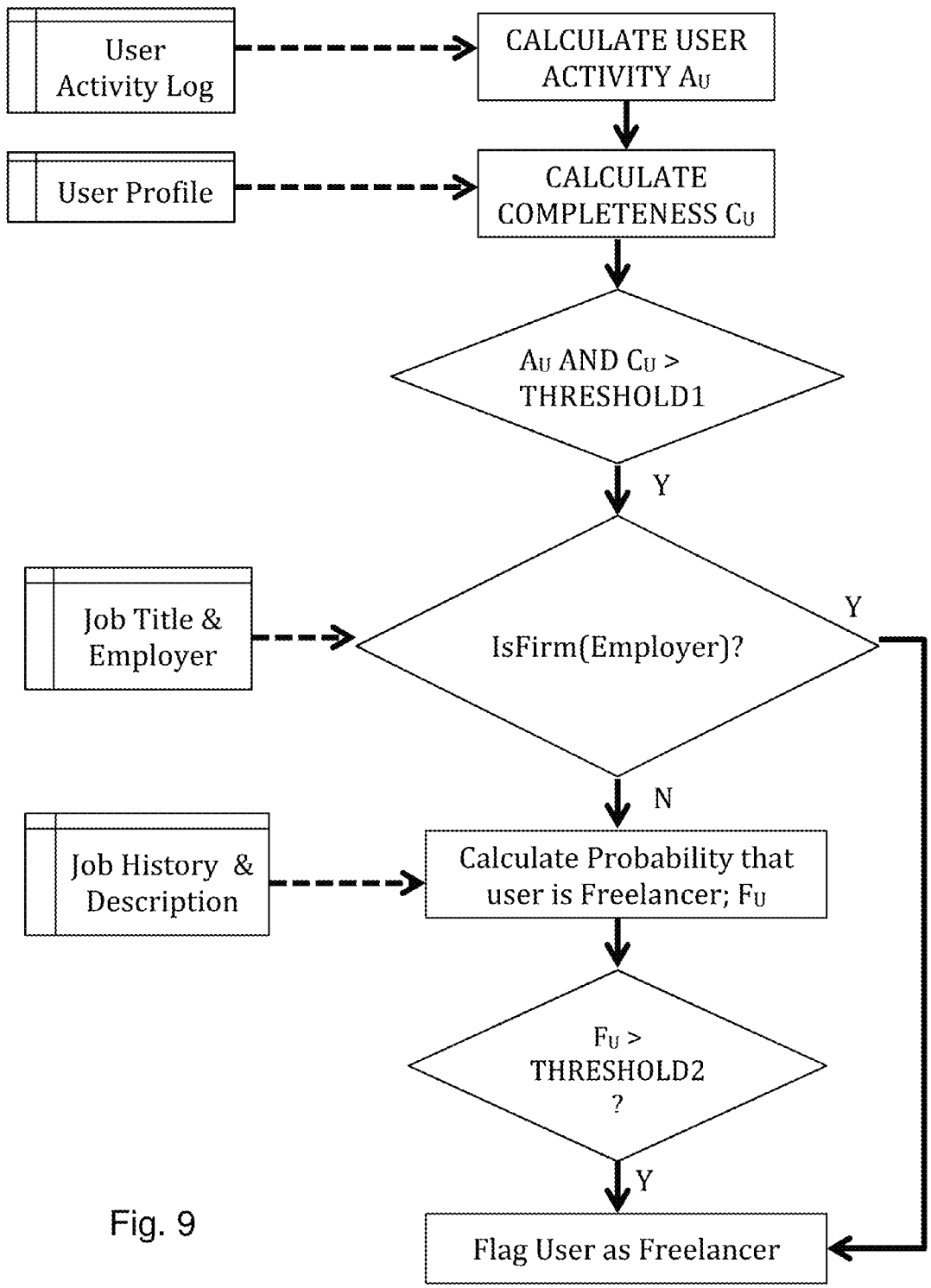
FIG. 9 is a flowchart of identifying freelancers in a social network.

FIG. 6 is a flow chart for a computer process to implement an online marketplace for connecting service providers and service requesters. The processor may receive the service request and service providers. The method is intended to be carried out on a computer system, such as that of FIG. 1. A computer processor receives descriptions of requests for professional services via a Web Server 21 providing a User Interface (UI). The processor receives profile data of service providers. The requests and profiles are stored in a database as electronic documents. Scores are calculated to rank service requests and communicate them to service providers and/or rank service providers and communicate them to the service requester.

The process may be used in a search query by one party looking for a matching, complementary party, in response to a new request or profile entered into the database, or in push-type recommendations (unsolicited) sent to a user associated with either the request or profile.

For each request or profile document, the set of matching complementary documents may be ranked and compared to a threshold value. A subset of the highest-ranked matches, above the threshold, are retuned to a user as search results or pushed to a user as suggestions.

For example, the processor communicates a subset of the best matching service providers to a requester associated with the service request. The processor communicates a subset of the best matching service requests to the service providers. The processor provides one or more of: a profile document, a request document, a link to another user's profile, a link to a request, or the identity of another user.

The matching and scoring may comprise a plurality of considerations such as social relevance, service similarity, and user behavior. The method may implement pre-processing steps on the request data or profile data to improve the match accuracy and reduce real-time processing times.

Database

The social network comprises a database storing profiles of professional people and of organizations and also records social connections between people (e.g. colleagues, friends, communications, follow), between organizations (e.g. follow, client, vendor, partnership), and between people and organizations (e.g. follow, employment, "was educated at"). The present graph is an efficient structure to implement such a database, whereby nodes store profiles for people/organizations and edges record the connections. The connections may be uni-directional (e.g. follow, like) or bi-directional (e.g. friendship, coworkers). The graph may be operated as a social network whereby users actively create connections and interact with other users.

The graph may also be an implicit graph, whereby a computer process assembles data about users and determines probabilities that users know each other or have something in common. For example, a computer may import electronic address books of users or import customer relationship management (CRM) data. The computer may implement rules, such as 1) a user's possession of another's email implies a social connection exists therebetween, 2) the frequency of email communication indicates the social strength, and 3) a customer record in a CRM indicates a client-freelancer relationship. Search engines and content management engines may also build an implicit graph from commonalities in search parameters, social network postings, and commenting amongst users, despite the fact that the users have never met each other. The implicit social graph may be a weighted graph, where edge weights are determined by the frequency, recency, and direction of interactions between users.

A database system may comprise or be derived from multiple databases, possibly including third party databases. Each database may store its own graph to capture certain relationship types and having at least some users in common such that a database system server can detect separate instances of a person on each graph, merge them, and analyze the mixed relationship modes between users across all graphs.

Additional databases may be provided to store service models, service requests, and index of service providers. The models and index provide for more efficient searching and real-time ranking by pre-computing aspects of service requests and service provider profiles that can be used later.

Identifying Services of Providers

Current social graphs have millions of users with many different reasons for their existence on the graph. Their intent may be business networking, being hired, being a freelancer, etc. It is an objective of certain embodiments for a Service Extraction Agent 25e to use computer techniques to learn or infer which users should receive service requests, preferably with respect to specific services.

This determination of services requires more than simply determining that a user's profile matches the search query. Many users may be highly qualified, closely connected to the buyer, but unable to respond to a service request because they are currently unable to work for third parties part-time or temporarily. This situation is different on professional hiring websites where one may assume that all users are open to receiving full-time job postings. Consider the example search results of FIG. 2, showing four profiles of candidates matching the search terms "Patent Drafting." Each user matches the search query for different reasons (patent attorney, patent examiner, patent paralegal, and having a patent) and each appears qualified for a patent-related, full-time job. Filters on location, company size, school, industry and seniority reduce the number of candidates but do not determine intent. However the patent examiner and scientist are not able to provide services to a third party as it would conflict with their present work and the scientist and paralegal do not offer that service. Conversely, the right-most user in FIG. 2 would be in a position to respond to the service request because they are qualified to provide "patent drafting" services and their employer is in a class of companies that provide professional services.

To a skilled recruiter, this structure in FIG. 2 tells a story of the candidate's career and identifies skills, attitudes and buzzwords relevant to judging whether the candidate overall is a good fit for a company. The structure is not suited to sorting and searching by the services the freelancers currently provides.

One solution would be to request that all users explicitly indicate whether they want to provide services and, if so, what services. Otherwise the system must estimate what services the user is offering.

In the present system, a Service Extraction Agent (SE Agent) 25e is used to read professional profiles, determine what services each user is offering (if unknown) and evaluate what evidence exists in the social network. Conceptually separate, a Matching Agent 25f determines users whose profile data satisfies the parameters of the service request.

The breakdown of all services may be represented by a services model. The model may be a formal taxonomy, each node in the taxonomy representing a set of synonymous service n-grams (for example "patent drafting", "file an invention", "patenting", "brevet" etc.). Each node may also be associated with a set of features, which are indicative of the service but are not services themselves. These may represent skills, industry buzzwords, tools, and education that correlate well with the service for that node. For example, "Java" is not a service itself but correlates well with various services, including "web design." The features may be stored as a feature vector indicating the strength or frequency of each feature with respect to that service.

In certain embodiments, a taxonomy is built using industry experts to map features found in profiles to each service. The model may include rules and weightings of features by field of the profile. For example, a skill feature may contribute progressively less when listed in older employment fields or features listed in endorsements could contribute more than job titles.

In another embodiment, a supervised classifier is built from expert or historical data to train the model. In this case a set of several thousand profiles paired with their respective known (or expected) service offerings are fed to a classifier in learning mode. Using one of many suitable classifier techniques, such as Naïve Bayes, (forests of) decision trees, SVM, or neural nets the model learns mappings from profile features (e.g., n-grams, numerical values) to services.

In yet another embodiment, the model is built using unsupervised learning techniques. In this case, the model simultaneously learns what services exist and who provides them. Without historical data, a topic model technique such as LDA, could be used, whereby the model learns which features (words/n-grams/phrases/skills/fields) commonly appear together. These commonalities are clusters of services and the users having those clusters are providers of those services. In the unsupervised case, there is a potential to learn non-intuitive commonalities and identify emerging services, however, the clusters do not necessarily define services as cleanly as a human would.

The above models preferably incorporate a hierarchy from broad to specialist services. Thus providers of and requests for general services can be matched, whilst progressively more specialized service areas provide for more personalized matching.

In any of the above modeling techniques, it is preferable that separate consideration is made for the provider's current employment data, other profile data and connections to other users on the social network. The processor preferably separates these data for separate entry into the model. Thus it is desirable that the current employment data, such as current job title, summary, current responsibilities, current employer, recent projects, be more heavily weighted in determining the service(s). Additional data is less weighted but still provides separation amongst the service classes/clusters.

Alternatively, current employment data is used to determine the broad service class/cluster and additional data is used to evaluate the confidence of those services or to determine the more specialized classes/clusters. For example, a user that currently is a web designer, but previously acquired marketing skills and has a degree in law is determined foremost to offer web design services albeit in a cluster with a subset of marketing, legal keywords.

In preferred embodiments, the profile data is further segregated by field and then fed to the model. This enables the model to differently weight or differently treat the same feature occurring in different fields of the profile (e.g. summary of skills vs. endorsed skills). As above, this separate treatment may be based on expert rules or learned from training data.

An additional source of data for the service determination is from objects connected to the service provider: projects, employer, and social contacts. The processor retrieves data objects connected to the present social provider to further calculate the confidence values Cp or refine the service cluster/class. These data objects should be pre-labeled or otherwise preprocessed to determine what services these objects are relevant to. The services model or a separate model could be built to translate user profiles into a vector of services to which they are relevant to referee.

When historical data is available, collaborative filtering techniques may be used to learn features common to certain similar providers and common to similar services. Once again some of the commonalities may not be intuitive. This is likely to be a sparse matrix as there will be potentially millions of user profiles and thousands of services. Thus matrix factorization is preferred such that each user or service is approximately described by a small number of latent variables.

Using any of above techniques, a processor builds a services model and then inputs profiles of identified service providers. The model outputs data representing services offered, per provider, preferably represented as a vector of services Sp and associated confidence scores Cp.

The model is used to build an index on services (e.g., a list of all freelance graphic designers) using any suitable technique, such as ElasticSearch or specialized database. The index may comprise a set of users (identified by their unique ID), their respective services, and one or more respective scores for each service.

Preferably the services model and the service index for the freelancers are built offline. These are updated periodically or as processing bandwidth becomes available. New profiles, new services, new requests, and historical behavior are used to continually refine the model and index.

Historical data is recorded about the behavior of service requesters and providers in the marketplace. User actions with respect to: searching for providers/requests, accepting requests, declining requests, communicating with providers/requesters, posting content sharing content, and shortlisting providers/requesters are recorded. The historical data may be used to train a model to learn correlations between buyers, freelancers, services offered, and service requests. The services model may apply a weight to each action to determine positive and negative correlations. The aggregate of all user actions are used to refine the various services models. For example, a service provider accepting or responding to a service request creates a positive correlation of that provider profile data with the service request document.

Although separate models may be built for each type of data (e.g. profile, request, referee, or project), the services model may be conceptually understood as a single model. The services model provides representations of several aspects of the marketplace: i) what service pertain to the service request, ii) what services each provider offers, iii) what services may be refereed by a social contact, iv) what services pertain to a project and v) which providers match with each request. When a provider responds (positively or negatively) to a request, or a requestor responds to a suggested provider, the services model is simultaneously refined for all three aspects. This refinement may take into account varying degrees of confidence about each aspect (e.g., for a provider with a long history of successfully offering a given service, a rejection might have little impact). This refining may be done explicitly using Bayesian inference (e.g., variational Bayesian methods), or implicitly (e.g., using collaborative filtering methods such as matrix factorization, or some other heuristic method). The models may include a temporal component for explicitly modeling changes over time (e.g., a hidden Markov model, where the latent variables represent which services the providers offer in each time period, where successive interactions reduce uncertainty in latent variables, and where periods of non-interaction result in increased uncertainty about the state of each latent variable).

The actions are carried out via a User Interface (UI) for the marketplace, the UI displaying suggested requests or providers to users and means to accept, decline, message, or shortlist them. In the graph structure, the past actions may be stored as action edges between service request and provider profile nodes to enable subsequent processing.

Historical data may also be used to modify an individual service provider's service vector. The processor may modify the extracted services Sp or the confidence values Cp for a given provider depending on how that provider acted with respect to previous service requests. Thus if the confidence Cp_i corresponding to service Sp_i for a provider drops below a threshold, the service Sp_i may be removed from the set Sp.

Advantageously, learning from historical behavior data enables the system to capture subtle variations in service clusters beyond what an expert would expect. The models thus enable nuanced matching between users based on how similar users have acted before. Moreover, historical data enables the SE Agent to identify users that appear to offer a service but rarely do so.

Certain user actions in the social network system are typical of service providers expressing activity with respect to their services. The present authors have observed that freelancers on social networks, compared to other users, tend to update their profile more often, post content more often, and receive more references, particularly from past clients. Thus in certain embodiments, the SE Agent may first assess that a user might be a service provider by detecting the number of posts, referrals, and frequency/recency of profile updates. The SE Agent determines likely service providers by, for example, comparing a weighted average of these social data to the average for all users.

Given a known or likely service provider profile, the SE Agent may pass the content posted or reference received by the provider to the services model to determine for which services they are relevant and relevance scores. For example, a provider may post their advice on a topic, including features which are highly correlated with one or more service classes or clusters. The output is a vector of these classes/clusters and a probability score. The SE Agent uses this vector in identifying or corroborating the provider's services offered.

Search Request and Matching

Current web directories of service providers allow searching of: a) fact-based attributes, such as location/size; b)

keywords in the profiles and c) standard service tags, such as "marketing." Whilst fact-based searching may provide value to the searcher (e.g. location may be a strict requirement), keyword searching is notoriously less successful, being rather strict, arbitrary and relying on the profile data including all the right terms with correct spelling. On the other hand, standardized service tags provide for straightforward computation of a match but fail to appreciate the depth of each service offered and the subtle variation in the way the tags are understood by each party.

The present technique provides a smart service search, with certain embodiments providing discovery of new services, trending services, and evidence of the purported services offered. Thus the search results will include service providers that are relevant to the search parameters, likely to respond if contacted, backed by evidence in the social network, and preferably customized to the service requester.

The service request may be entered via a UI by the service requester to input one or more criteria about the service, attribute filters, and free-text entry. The free-text may be used to identify the services to be provided or to describe the requester's background, needs, services or goals. The criteria about the service may be selected from a set of predefined options. The predefined options may vary by service(s) requested, whereby the Request Agent selects, from a database, one or more sets of criteria options to display to the requester. The subsequent criteria selection is used during the search of the services index to identify suitable service providers.

The free-text may be a brief having a plurality of fields, such as background, goals, and service/project preferences. Similar to estimating services from profiles, the Service Extraction Agent may separately input the fields of briefs into the service model, where they are weighted or treated differently to output a set of estimated services, classes, or clusters. Thus, for example, a lawyer searching for accounting services is very different from an accountant searching for legal services, so these fields (client data vs. service requirement data) should be treated differently.

The Request Agent 25d may preprocess the brief to extract appropriate search parameters. The Agent may process the brief document using a model to determine a vector of topic probabilities, latent variables, service classes, or key features. The model may be the service model above or a separate service request model. In this case, the output may be a set of services requested (rather than service offered). Additional parameters unrelated to services, such as location, may be extracted from the brief using a natural language processing tool.

Using a Topic Model, the features in the brief may be converted to a distribution of service topics. An expert system model may map features in the brief to one or more service nodes.

The advantage of using a brief is that the services model (or service request model) can use machine learning to resolve the request into a subtle variations of services requested, by including consideration for other keywords used, which are not services themselves. The outputs of the pre-processing are compatible with the index of service providers, which index provides faster subsequent searching. The model is able to use Big Data to learn subtleties that a human would miss from their limited experience of a few requests.

The search parameters (including processed model parameters, if any) are passed to the Matching Agent to identify a set of service providers from the social network that satisfy the search. The providers are preferably indexed by service (see above) to decrease the search time. The Matching Agent scores and ranks the individual providers based on the quality of the match and social signals derived from the social network.

The Matching Agent compares the services offered by each provider to the services requested; the comparison technique depending on the structure of the model used above to extract the services. The output is a provider relevance score, being a measure of similarity, distance or overlap of services.

In the case where a Topic Model is used to estimate probabilities of service topics, the measure can be the f-divergence or Kullback-Leibler divergence, which measures similarity between distributions. Alternatively the topics could be treated as a vector and a weighted distance calculated between topics of a request and of a provider (e.g., weighted Euclidean or Minkowski distance). The Matching Agent can use historical data of matches that were successfully accepted by users to vary the weights. Advantageously, this enables the matching algorithm to attenuate topics that are not decisive of a good match.

In the case where a vector representation of services (or of latent variables) is used, the measure can be calculated from the dot product of the services offered and services requested.

Functions to calculate similarity, distance, or overlap are known for each of the various modeling techniques that may be used to model the services.

The search query may be a combination of a) selections of pre-defined services b) filters on pre-defined attributes c) free-text document describing the request (i.e. a brief) and d) free-text input with autosuggest selection. There may be one or more follow-on questions that require user input.

The choice of input mechanism for the search will depend on the compatibility with the services model, in order for the model to infirm the search parameters and provide sensible feedback to the searcher. For example, it is harder for the Request Agent to derive user-friendly feedback or search options from service models that store results mathematically, use latent variables and/or are built unsupervised. On the other hand, expert systems may be used by the Request Agent to create trees of questions and input requests to navigate the user through to the most appropriate services.

In preferred embodiments, the Request Agent is arranged to receive a free-text query, which is processed using Natural Language Processing (NLP) to understand the context of the request. The Service Extraction Agent determines one or more classes, clusters or service nodes SR that match the request with confidence CR. The Request Agent may feed back, via the UI, indications of these services for user selection (e.g. using a drop-down menu). This allows the searcher to transform their request from a fuzzy request into a selection of services that actually exist within the service providers of the social network.

As discussed above, the service model may have a hierarchical structure in which case the feedback of potential matching services to the user may proceed from the most general level to the most specific, whereby the searcher progressively expresses interest in more specific services.

The workflow for matching a request is displayed in FIG. 6. The Request Agent receives, via the UI, service parameters comprising text features, filters and menu selections. The service requester's attributes are retrieved from the social network and if known, the requester's employer's attributes (e.g. locations, industry, size, name). These attributes are appended to the user-entered search.

The search is processed into a service request using the Service Extraction Agent and the Services Model. The Matching Agent then identifies a set of results Sm of service providers from the service index or service headers from the model satisfying the search request with confidence CM. If the Services Model is hierarchical or the confidence about the matches CM is lower than a threshold, the Request Agent may display a plurality of service headers to the searcher to choose from. The Matching Agent may repeat the search and the Request Agent may re-display headers until a sufficient confidence CM is reached, until the lowest level of the hierarchy is reached or until fewer than a threshold number of service providers are within the set of results.

The Matching Agent 25f calculates a relevance score for the providers in the set of results. The Social Relevance Agent then calculates a social relevance score for each provider based on his or her social contacts. A total score for each provider is calculated and used to rank the providers, a subset of which is communicated to the service requester. A set of service requests that highly match a service provider may also be communicated to the service provider, whereby the provider can view, accept, respond to, or decline the request.

Social Network Relevance

A Social Relevance (SR) Agent 25c retrieves data from the social network of a service provider to calculate a social score, Stotal, for the user. Various embodiments of calculations are described below, any combination of which may be used to calculate a social score.

One factor may be the degree to which immediate (i.e. first hop) social contacts of a service provider are qualified to recommend the provider for the service request. The SE Agent 25e evaluates the profile data of the social contacts relative to the service request or relative to services offered by the service provider. This is not a measure of likelihood that the provider is connected to the requester but rather a measure of the professional relevance of the service provider's own immediate social network towards the services provided or the services requested. Thus the existence of relevant social contacts is an indication of the service provider's relevance rather than identification of people for the requester to contact in order to receive a reference.

A second factor is the activity level of a social contact on the social network. In one embodiment, the SR Agent retrieves past activity on the social network for each contact to calculate scores $S_2$. The calculation may use data about: login recency (e.g. number of days prior); login frequency (e.g. number of times logged-in per month); and actions made on the website (e.g. number of postings, comments, profile views, searches, and likes). Preferably the score $S_2$ is a weighted combination of these factors, and then normalized relative to the activity distribution of all users. Preferably these activities are expressed as a rate and/or with a decay factor to attenuate older activities.

A third factor is the inferred professional insight that the social contact is likely to have about the service provider. The SR Agent infers this by traversing the social network to detect a professional overlap between a social contact and provider with respect to an employer or a past project. The graph may be structured in various ways to record employment and mutual association with past projects, with corresponding various ways to structure the overlap query. For example, an employment graph may store people and organizations as nodes with edges between people and organizations recording employment, wherein the edge object stores values for the job title and period of employment. A professional overlap may also exist from working on a past project together, i.e. not necessarily as coworkers. An edge between user nodes may record a mutual project, or user nodes may both be connected to a common project node.

A fourth consideration is the strength of the connection between a service provider and their contact, as measured by connection activities such as endorsements, messaging, "liking" and sharing of content. The SR Agent may use past endorsements made by the contact with respect to the service provider to increase the score $S_4$. The relevance of the skill or service endorsed to the service requested/service offered may also be determined to calculate $S_4$. The system preferably also records whether a social contact has previously responded to a request from a user to provide a reference about a given service provider. This may be recorded as an edge between users and recording whether a reference was made and any review score provided. The SR Agent increases score $S_4$ if there exists a previous response to a reference request, the response being from a relevant user, about a relevant service, and with a positive review score.

Figures 3A, 3B:
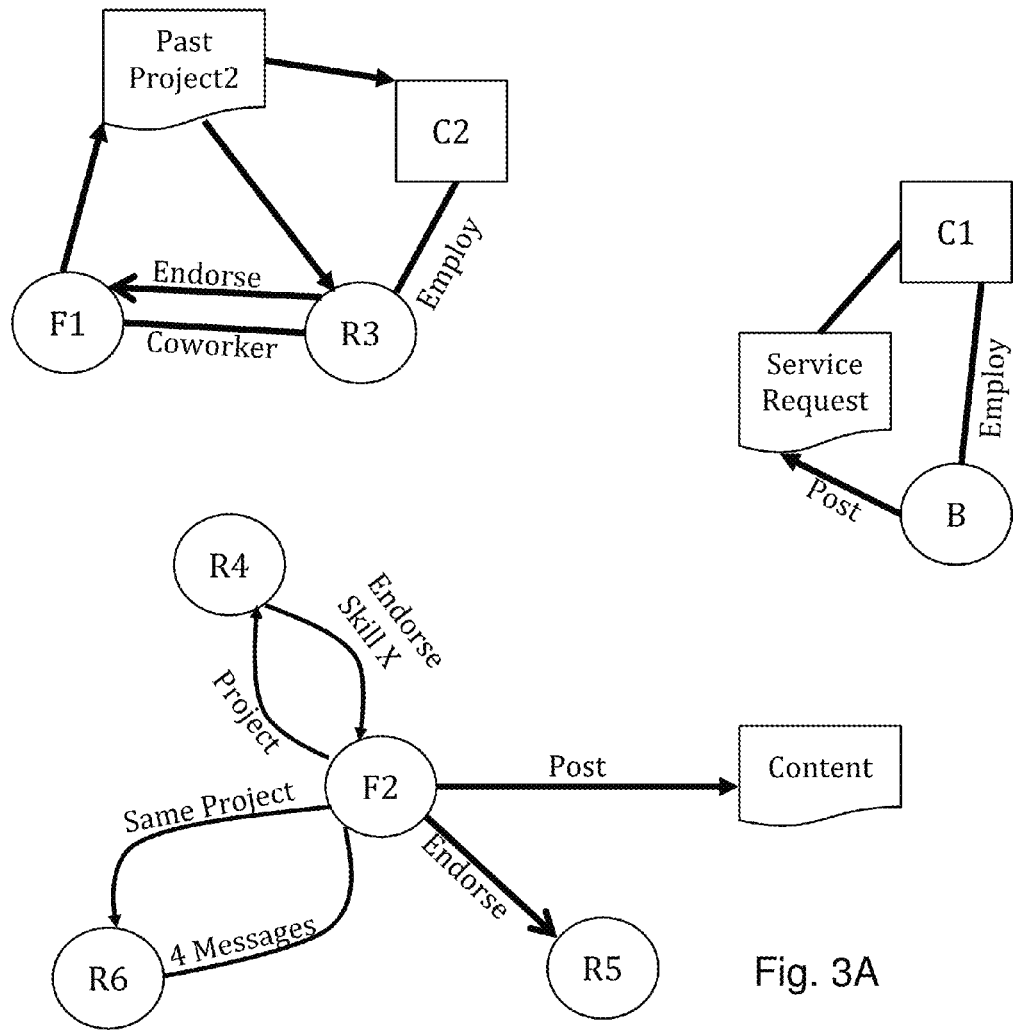
FIG. 3A is a portion of a social graph relevant to a search for a freelancer.
FIG. 3B is a table of computed scores for a freelancer.

FIG. 3A illustrates a portion of a social network including the service requester B, companies C1 C2, social contacts R3-R6 (referees), and two identified service providers F1, F2. For ease of understanding, squares represent companies C, circles represent users (freelancers F and referees R), document shapes represents service request, past projects, and posted content. Lines represent bi-directional connections and arrows represent unidirectional connections.

Which freelancer has the more relevant social score? F1, R3, and C2 are all connected to Past Project2, which project is determined to be relevant to the services offered or services requested. C2 has attributes similar to C1, the employer of the Buyer B. R3 has endorsed and previously worked with F1. These weigh in favor of F1.

Freelancer F2 is connected to three referees with varying professional relevance, social activity and connection modes to F2. F2 has also posted content, which content is determined to be relevant to the services offered or services requested. These weigh in favor of F2.

Using the above factors, the SR Agent calculates a social score Stotal for each service provider. For each social contact, the relevance score $S_1$ and likelihood to reply $S_2$ are calculated. The SR Agent also calculates the scores, $S_4$, $S_3$ for the connection edges to the social contacts. Then for each contact $S_1$, $S_2$, $S_3$ and $S_4$ are multiplied together to get the total score for that social contact and all total scores of a service provider's contacts are summed to compute a social relevance for the service provider.

The relevant portion of the social graph can be reduced to simplify calculations by excluding connections (edges) and contacts (nodes) where the associated scores S1, $S_2$, $S_3$, and $S_4$ are less than a threshold value.

FIG. 3B is a table of mock scores for social contacts of F2. The factors are individually calculated and multiplied for each social contact. In this calculations, contacts R4, R5, R6 need to be relevant, active and have professional knowledge of F2 to attain a high social score Stotal. In this example, R6's score was less than a threshold and thus ignored. The social scores Stotal and relevance of F2 itself are added (weights are both 1 here) to obtain the overall the score of F2.

It will be appreciated that modifications to this algorithm may be made that still capture the social factors considered above. For example, totals may be summations, rather than products, of scores. Weightings, non-linear scaling, and thresholding of factors may be used to adjust the relative contribution of factors.

Figures 3C, 4:
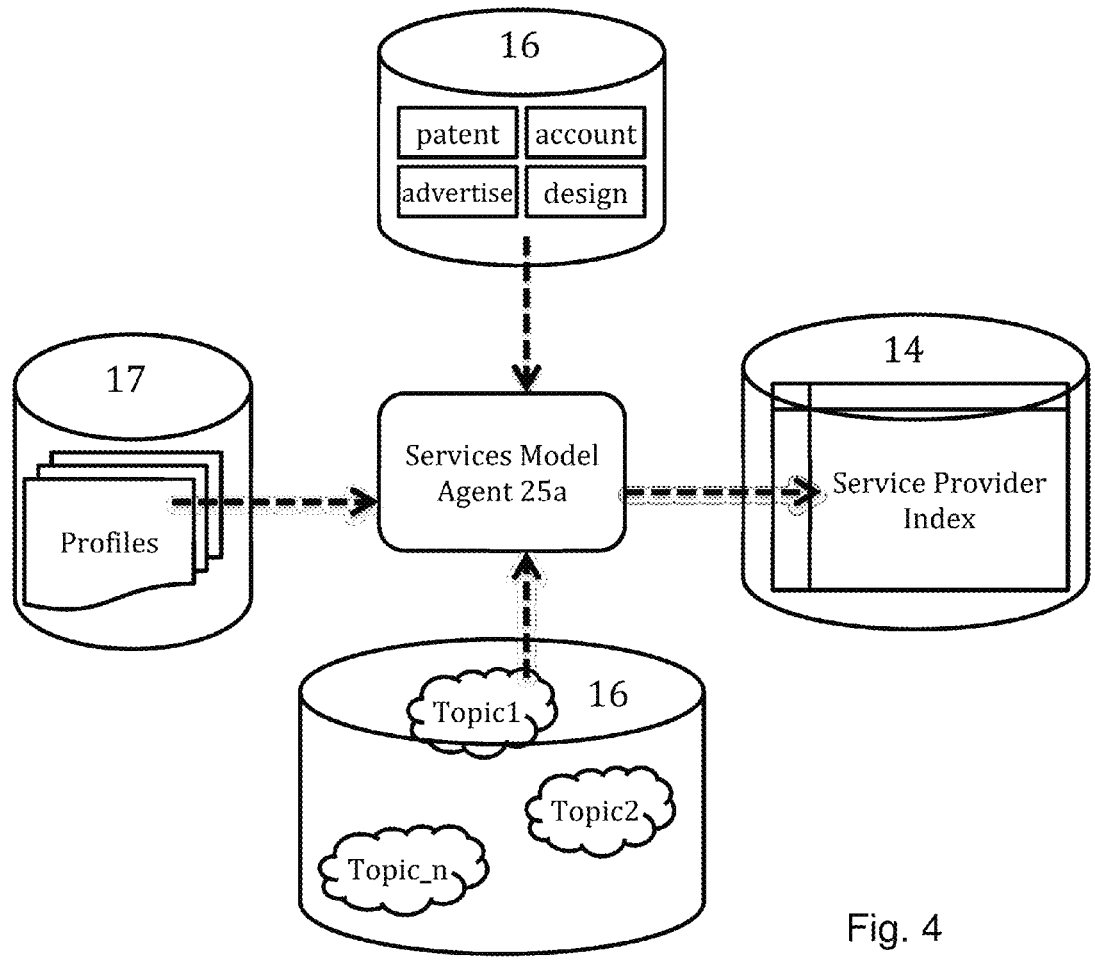
FIG. 3C is a table of computed scores for social contacts
FIG. 4 is an illustration of elements of a services model.
Figure 5:
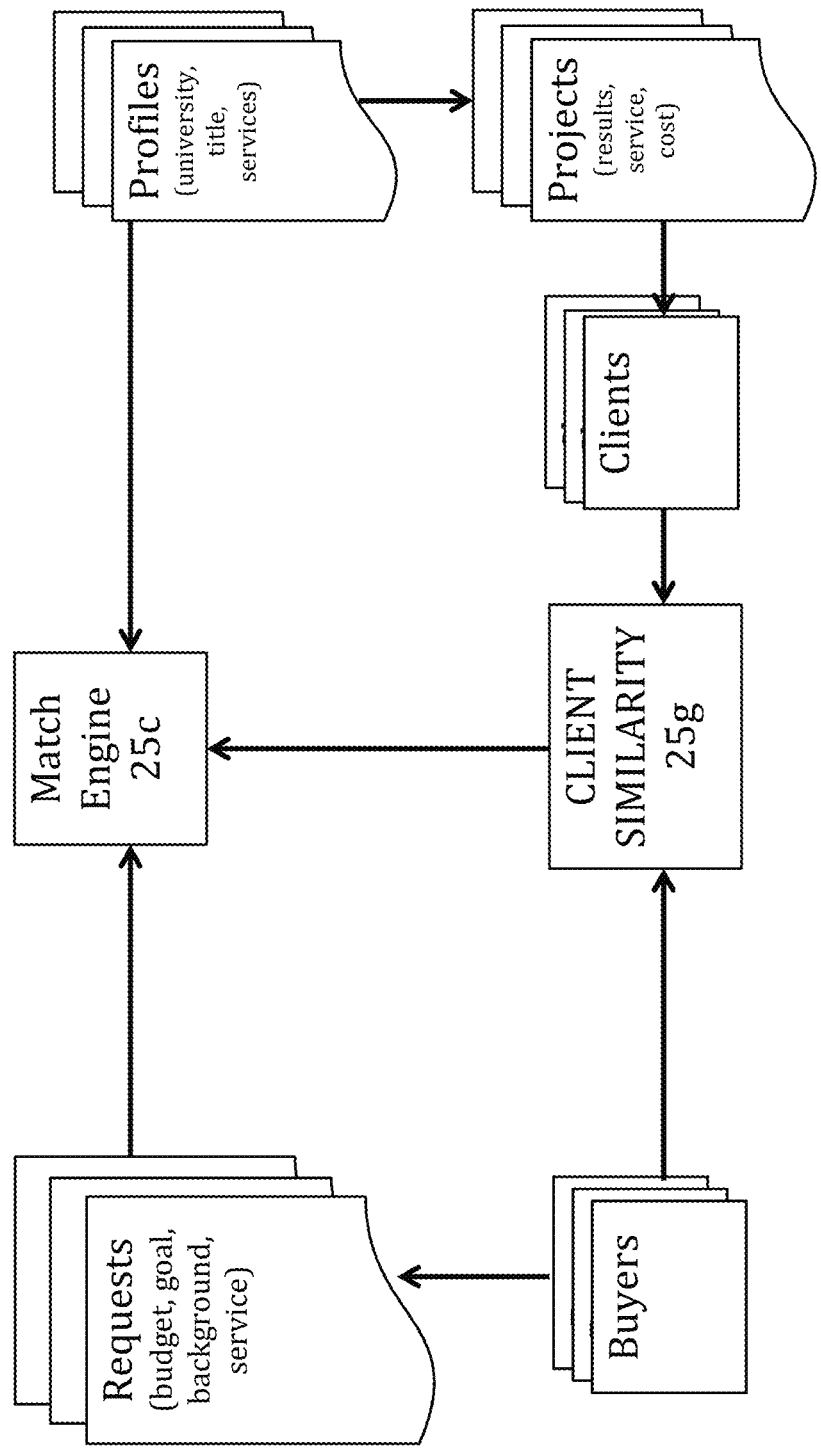
FIG. 5 is a diagram of a matching agent using past projects and client similarity.

FIG. 3C is a table of mock weights, scaling functions, thresholds and values to obtain scores for R3. In this example, each factor is compared to the threshold, and if sufficient, scaled by a function and then multiplied by the weight. In this example, all the factor scores are added (not multiplied as in FIG. 3B) to obtain ΣStotal.

A professional social network may further provide indications of relevance from other objects connected to a service provider. By extending the network traversal to include organizations that were clients, the Social Relevance agent may calculate similarity between the organization associated with the present service request and organizations associated with past work done by service providers.

FIG. 3A (top) illustrates a way of recording in a graph that company C2 employs referee R3, both associated with a project object "Past Project 2", which was performed by Freelancer F1. Here it is somewhat redundant that both C2 and R3 are connected to the project object. In an alternative structure, illustrated in FIG. 3A (bottom) F2 is connected to R4 by a project edge, the edge storing any details about the projects. R4 is employed by a company (not shown). FIG. 3A (right) illustrates how company C1 is associated with the service request either as employer of buyer B or connected directly to the request.

Therefore a social graph may have data object representing past projects in different ways, i.e. as an edge or as a node. Edges are preferably directed edges in order to indicate whether a connected user/organization is a provider or receiver of the services of the project.

To calculate social relevance score $S_5$, the Social Relevance Agent identifies past project(s) connected to and performed by the service provider. This may be a project edge, project node or other object suitable for the data structure used. A Similarity Agent then identifies organizations associated with these past projects as clients. The status as client may be recorded explicitly or known from the direction of the edge. The Similarity Agent then retrieves the attributes of these client organizations and attributes of the organizations connected to the service request. The Agent calculates social relevance score $S_5$ from a weighted comparison of the attribute values, for example a dot product of attribute vectors. The relevance calculation may include distances between location attributes, similarity in size attributes and similarity in industry attributes. Other measures of relevance may be calculated from time-series analysis of the attributes of organizations. Further examples of similarity calculations are provided in U.S. Ser. No. 14/690,325 entitled "Influential Peers" and U.S. Ser. No. 14/537,092 entitled "Recommendation Engine," incorporated herein by reference.

Alternatively or additionally, the Similarity Agent may calculate the social relevance score $S_5$ from the similarity of profiles of the person requesting the service and of a person recorded as a client of the Service Provider, for example, between B and R6 or B and R3.

The Social Relevance Agent may also identify content objects connected to each Service Provider and calculate their relevance $S_6$ to the services requested. Content may be documents, images, and videos that are posted by service providers that describe past work, give advice, or provide samples of work. The relevance to services may be determined from the content's tags or text features in documents. The processor may pass these tags/features to the Services Model and receive a representation of services. The Matching Agent then compares this representation to the search query to calculate the relevance $S_6$.

$S_6$ and $S_5$ may be combined with the other social scores $S_1$ to $S_4$ to determine the total social score $S_{total}$ for each provider. It should be noted that the social scores are calculated with respect to a particular service and thus scores $S_1$, $S_3$, and $S_6$ will vary by service for the same service provider. The services model may receive as inputs, social data and particular service(s), and then output scores $S_1$, $S_3$, and $S_6$ with respect to each of those services. Thus each of those scores may be represented as a vector of services and values. Advantageously, with this approach a relevance score can still be calculated for social data objects that are tangentially related to the services, even though those services would not be the most related services.

Alternatively the services model takes social data and then outputs a vector of the top services for which the social data is relevant. This vector can be compared with the service(s) of the provider or of the service request to create the scores $S_1$, $S_3$, and $S_6$ per services. Advantageously, with this approach the vector can be computer once for each social object and stored for later use.

For example, a social contact's relevance vector (marketing, 0.8; PR, 0.7 legal, 0.6; accounting 0.2) is multiplied by the service request vector (marketing, 0.7; PR, 0.3; legal, 0; accounting 0) to calculate a vector score (0.56; 0.21; 0; 0) and then scalar score of 0.59. Of course, different scoring algorithms are required if the service model is a neural net, topic model, classifier, services tree, etc.

Although scores $S_1$ to $S_6$ have been as depending on certain separate social data, the skilled person will appreciate that these groupings are arbitrary and provided for simplicity. Any combination of the above social data may be used to calculate a social score $S_{total}$.

Capacity

Individual service providers are limited in their capacity to deliver services, more so than firms of many employees. This capacity critically affects their ability to take on new projects and the ability of buyers to meet their own deadlines. In certain embodiments, each service provider is associated with a capacity data object. The capacity object stores data such as periods available, periods working for certain clients, and proportion of each period dedicated to each client. Alternatively the capacity object simply records a total capacity and proportion assigned to existing projects. The capacity object may implement a calendar to record holidays, vacation days, days assigned to certain projects, and normal working hours/days.

The present system includes a Capacity Agent that updates the capacity object and detects scheduling/capacity conflicts. Users set their capacity or periods available then record the proportion or periods already dedicated to existing projects in provider's profile object or connection edges to client/project objects. When a service provider and a requester agree to connect via a new project, the Capacity Agent automatically updates the capacity for the provider. The project data includes a start date, end date, man-hours, timespan and/or proportion dedicated to this project.

The requester and/or provider may also estimate the temporal requirements of the service request. The Calendar Agent compares the temporal requirements to the calendars of the service providers to determine conflicts, which may be used to filter out or at least reduce the total score for conflicted service providers.

As an example, the system receives a request document, which includes a preferred start date, expected project length in weeks, and budget. The Calendar Agent estimates the quantity of work from the budget (for example budget divided by billable rate). The Agent retrieves the Calendar Objects of service providers satisfying the request parameters, and compares the dates of the request to the available dates and available capacity. The agent determines a subset of providers who have sufficient capacity during the period concerned. This subset is communicated to the service requester.

Display

The system receives queries and communicates results to users via a user interface on the user's computing device. The system prepares web content from the vendor and evidence data objects. A serialization agent serializes the web content in a format readable by the user's web browser and communicates said web content, over a network, to a client's or vendor's computing device.

Display of a user means that data elements identifying a vendor are retrieved from a user profile object in the database, serialized and communicated to client computing device 10, 11 for consumption by the user. Display of a project document may similarly be made by displaying the text from the document or a multi-media file (e.g. JPEG, MPEG, TIFF) for non-text samples of project.

The above description provides example methods and structures to achieve the invention and is not intended to limit the claims below. In most cases the various elements and embodiments may be combined or altered with equivalents to provide a recommendation method and system within the scope of the invention. It is contemplated that any part of any aspect or embodiment discussed in this specification can be implemented or combined with any part of any other aspect or embodiment discussed in this specification. Unless specified otherwise, the use of "OR" and "/" (the slash mark) between alternatives is to be understood in the inclusive sense, whereby either alternative and both alternatives are contemplated or claimed.

Reference in the above description to databases are not intended to be limiting to a particular structure or number of databases. The databases comprising documents, projects, business relationships or social relationships may be implemented as a single database, separate databases, or a plurality of databases distributed across a network. The databases may be referenced separated above for clarity, referring to the type of data contained therein, even though it may be part of another database. One or more of the databases and agents may be managed by a third party in which case the overall system and methods or manipulating data are intended to include these third party databases and agents.

For the sake of convenience, the example embodiments above are described as various interconnected functional agents. This is not necessary, however, and these functional agents may equivalently be aggregated into a single logic device, program or operation. In any event, the functional agents can be implemented by themselves, or in combination with other pieces of hardware or software.

While particular embodiments have been described in the foregoing, it is to be understood that other embodiments are possible and are intended to be included herein. It will be clear to any person skilled in the art that modifications of and adjustments to the foregoing embodiments, not shown, are possible.

The invention claimed is:

1. A computer-implemented method for automating an online services marketplace, the method comprising:
    providing a service index for searching for service providers indexed by a service that they provide;
    a processor receiving a plurality of service requests from a plurality of first users, each request indicating a service to be provided and criteria related to the service;
    for each request,
        the processor identifying, from the index, a plurality of second users that provide the service of that request;
        the processor retrieving profile data associated with the plurality of second users;
        the processor processing profile data of second users using a services model to calculate the relevance of professional profile data of the second users with respect to one of the service requests;
        wherein the step of identifying the plurality of second users that provide the service of the request comprises parsing a professional profile with a service extraction agent, estimating a confidence level that a user in the service index provides the service of the request when the professional profile does not expressly recite the service of the request, and outputting the plurality of second users having confidence levels above a threshold value;
        wherein the step of processing profile data of second users comprises evaluating, for each of the plurality of second users, evidence as to the capacity of the second user to perform the service, said evidence comprising one or more features, each of the one or more features indicating an ability to perform the service other than a recitation of ability to perform the service; and
        the processor automatically matching, with a matching agent, at least one of the second users to that request based on the calculated relevance.

2. The method of claim 1, wherein the profiles are retrieved from a professional social network.

3. The method of claim 1, further comprising communicating to first users, an identification of second users that match the respective requests of first users.

4. The method of claim 1, further comprising communicating the requests to the second users that match the requests.

5. The method of claim 1, wherein the features of the profile data to be compared are derived from at least one of: current job title, skills, education, current and past employment.

6. The method of claim 1, wherein each service request further comprises a text describing aspects of the service to be provided and wherein matching is further based on a comparison of the features in the profile data of second users and features in the text describing aspects of the services.

7. The method of claim 1, wherein said relevance is a measure of how well the profile data of the second user provides evidence of an ability to provide the service.

8. The method of claim 1, further comprising determining for one of the second users, an activity level based on an amount of activity of that second user within a social network system or based on responding or declining previous service requests within the marketplace.

9. The method of claim 1, wherein matching further comprises determining similarity scores between the first users and clients of previous service requests performed by second users.

10. The method of claim 1, wherein matching further comprises a comparison of endorsements in the profile data of second users and the service request.

\* \* \* \* \*